3,206,400
MINERAL OIL COMPOSITION
Dervin L. Flowers, Los Gatos, Calif., assignor to Shell Oil Company, New York, N.Y., a corporation of Delaware
No Drawing. Filed Oct. 10, 1960, Ser. No. 61,350
10 Claims. (Cl. 252—46.6)

This invention relates to improved liquid hydrocarbons such as mineral oils, and particularly to heating fuels and engine hydrocarbon lubricants having improved detergency, viscosity index, wear inhibition, as well as enhanced oxidation and corrosion inhibition properties and to new and improved additives therefor.

Until recently, lubricants were commonly doped with various oil-soluble metal salts such as polyvalent metal sulfonates, carboxylates, phenates, phosphates, thiocarbamates, and the like. Some of these substances, such as the sulfonates, phenates and carboxylates possess detergent properties, some such as phenates and thiocarbamates are useful because of their antioxidant properties, and some such as the phosphates are useful as anti-corrosion additives. In general, these metallic compounds, when subjected to high temperature and high pressure conditions, break down and even act as pro-oxidants, causing deterioration of the oil base resulting in corrosivity, wear, etc. Recently certain non-ash oxygen and/or nitrogen-containing polymeric additives have been introduced, but these generally lack wear inhibiting and extreme pressure as well as high temperature oxidation inhibiting properties. Attempts to impart these properties to oil containing non-ash polymeric detergents by addition of conventional anti-wear and extreme pressure agents have been unsuccessful since such combinations generally tend to form complexes resulting in sludge and deposit formations.

It has now been found that liquid hydrocarbon compositions are improved with respect to one or more properties such as viscosity index, detergency, oxidation, corroison, and wear inhibition by a novel class of polymers, namely an oil-soluble polymeric compound having essentially a long linear hydrocarbon backbone chain and attached thereto in a uniform or random fashion two essential polar-containing groups, one being a sulfur-free ester group represented by —COOR, wherein R is a $C_{8-18}$ alkyl radical and the other polar group being a thioether-containing group represented by —S—R'—$(Y)_n$ wherein R' is a $C_{2-18}$ hydrocarbyl radical, preferably a $C_{2-8}$ alkyl, aryl, cycloalkyl, aralkyl, alkaryl or a polar-substituted hydrocarbyl radical (preferably substituted in the omega position), Y is an acidic-polar group such as halogen, cyano, mercapto, hydroxyl, carboxyl group, with preferred polar groups being —OH, —SH, —CN and —COOH, and $n$ may be zero or 1, but preferably 1. Polymeric compounds of this type should have a plurality of at least 8 units selected from

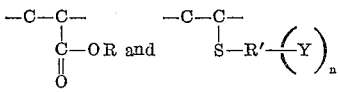

at least two of each such groups, and wherein R, R', Y and $n$ are defined as above and the number of units is such that the molecular weight of the polymer ranges from at least 1000 to about 2,500,000, preferably from about 10,000 to about 600,00.

The polymeric compounds of the present invention are readily prepared by various means such as by copolymerizing, in the presence of a suitable catalyst such as an azo catalyst, e.g. alpha,alpha'-azo-diisobutyronitrile or an oxygen-yielding catalyst such as various organic peroxides, including aliphatic, aromatic, heterocyclic and acyl peroxides, such as diethyl peroxide, tertiary butyl hydroperoxide, dibenzoyl peroxide, dimethylthienyl peroxide, dicyclohexyl peroxide, dilauroyl peroxide and urea peroxide. These are mentioned by way of nonlimiting examples of suitable organic peroxides. Other catalysts include sodium bisulfite, diethyl sulfoxide, ammonium persulfate, alkali metal perborates, etc.

The sulfur-free polymerizable ester monomer is an ester of an acrylic acid, generally containing from 3 to 9 carbon atoms in the acrylate radical, preferably from 3 to 4, i.e., the unsubstituted acrylate and the alpha-methacrylate radical. Other alpha-substituted acrylate radicals are exemplified by alpha-ethylacrylate and alpha-phenylacrylate. The alcohol used to form the ester is preferably a primary alcohol, although secondary and tertiary alcohols are suitable; it should contain at least 9 carbon atoms, preferably from 12 to 20, and preferably have a chain of at least 5 carbon atoms. Representative suitable alcohols are: n-octyl, n-lauryl, n-cetyl, n-stearyl, n-oleyl, 2,2,4,4-tetramethylpentyl and 2,2,4,4,6,6-hexamethylheptyl alcohols. Examples of suitable esters are n-nonyl acrylate, n-lauryl acrylate, n-stearyl acrylate, n-nonyl methacrylate, n-lauryl methacrylate, n-cetyl methacrylate, n-stearyl methacrylate, 2-ethylhexyl methacrylate, 2,2,4,4-tetramethyl lauryl methacrylate and their mixtures.

The other polymerizable monomer is a vinyl thioether (vinyl sulfide) $[CH_2=CHS—R'—(Y)_n]$ such as ethyl vinyl sulfide, tert-butyl vinyl sulfide, 2-methylpentyl vinyl sulfide, tert-dodecyl vinyl sulfide, octadecyl vinyl sulfide, cyclohexyl vinyl sulfide, phenyl vinyl sulfide, xylyl vinyl sulfide, tolyl vinyl sulfide, benxyl vinyl sulfide, 1-naphthyl vinyl sulfide, methylcyclohexyl vinyl sulfide, alpha-methylcyclohexyl vinyl sulfide, omega-hydroxy or omega-alkoxy, or omega-carboxyl-substituted ethyl, propyl, butyl, amyl, hexyl, octyl, stearyl, phenyl, cyclohexyl, benzyl vinyl sulfides, preferably omega-ethyl vinyl sulfide, omega-octyl vinyl sulfide, vinyl thioethyl glycidyl ether, omega-carboxyethyl vinyl sulfide and mixtures thereof.

The copolymers are prepared by polymerizing the two monomers in the mol ratio of 1:10 to 10:1, preferably 1:3 to 5:1 of the sulfur-free acrylate ester to the vinyl thioether (vinyl sulfide), respectively. The reaction is carried out in the presence of a polymerization initiator such as an azo or oxygen-yielding catalyst, in an inert solvent and at a temperature ranging from about 60° to about 150° C., preferably between 80° and 125° C. for a period of from 2 to 48 hours, preferably from 8 to 35 hours. The solvents are light liquid hydrocarbons such as benzene, xylene, toluene, light mineral oil, etc.

Various combinations of conditions may be employed to maintain the molecular weight within the desired range. Factors which exert an influence on the molecular weight of the polymer include the method of polymerization (e.g., polymerization in emulsion, suspension, solvent solution or bulk), the nature and concenartion of the catalyst employed, the temperature, and nature and amount of the particular monomers. When the polymerization is accomplished in solution, the molecular weight of the product will be lower when the dilution is higher, e.g., when the proportion of solvent is greater. With the same catalyst, the higher polymerization temperature tends to give lower molecular weight polymers.

Under certain extreme conditions the detergent properties of copolymers of the present invention may be further improved and wear inhibition properties imparted thereto, if necessary, by addition to the copolymer, based on the total monomer reactants, of from 5 to 30% preferably between 10 and 20%, of a polymerizable nitrogen-containing monomer, preferably polymerizable heterocyclic nitrogen-containing monomer which may be exemplified by 2-vinylpyridine, 3-vinylpyridine, 4-vinylpyridine, as well as the ring substituted alkyl derivatives thereof, e.g., 2-methyl-5-vinylpyridine, 4-methyl-2-vinylpyridine, 5-ethyl-2-vinylpyridine and 2-butyl-5-vinylpyridine, 2-methyl vinylpyridine and the like.

The following examples illustrate the preparation of suitable polymers for use in oil compositions in accordance with the invention.

*Example I*

A mixture of 5.4 mols of lauryl methacrylate, 3 mols of stearyl methacrylate and 1 mol of hydroxyethyl vinyl sulfide was added to a 50/50 mixture of benzene and light mineral oil diluent and the mixture was reacted in the presence of 0.25% ditertbutyl peroxide at 120° C. for about 24 hours. The copolymer lauryl methacrylate/stearyl methacrylate/hydroxyethyl vinyl sulfide was recovered by precipitation from a benzene-alcohol mixture and had a molecular weight of 400,000–500,000 and a sulfur content of 1.2%. It had good solubility in lubricating oil and imparted thereto detergent and VI improving properties.

*Example II*

A copolymer of stearyl methacrylate and vinyl thioethyl glycidyl ether was prepared by the method of Example I, using the reactant monomers in a molar ratio of 2 to 1, respectively. The molecular weight of the copolymer was around 420,000 and was oil-soluble and exhibited good detergent properties in lubricating oil.

*Example III*

A copolymer of lauryl methacrylate and octyl vinyl sulfide was prepared by the method of Example I in which the ratio of the reactants and conditions of the reaction were the same as described in Example I. The polymeric product had a molecular weight of 500,000, a sulfur content of 1.9% and was oil-soluble and exhibited good detergent and wear-inhibiting properties in lubricating oil.

*Example IV*

A copolymer of stearyl methacrylate, lauryl methacrylate and hydroxyethyl vinyl sulfide in the mol ratio of 2:3:1 was prepared by the procedure of Example I except that the reaction temperature was 100° C. and to the total monomer mixture was added 5% of 2-methyl-5-vinylpyridine. The copolymer was oil-soluble and the molecular weight was around 500,000 and exhibited good detergent properties.

The novel sulfide-containing polymers are effective as anti-wear and detergents in liquid hydrocarbon compositions such as mineral lubricating oil in the range of from about 0.001% to about 10%, preferably from about 0.02% to about 5% by weight. The lubricating stock for this purpose can be any natural or synthetic hydrocarbonaceous material having lubricating properties. Thus, the base may be a hydrocarbon oil within a wide viscosity range, e.g., 100 SUS at 100° F. to 150 SUS at 210° F. The hydrocarbon oils may be blended with fixed oils such as castor oil, lard oil and the like, and/or with synthetic lubricants such as polymerized olefins, copolymers of alkylene glycols and oxides; organic esters of polybasic organic and inorganic acids, e.g., di-2-ethylhexyl sebacate, dioctyl phthalate, trioctyl phosphate; polymeric tetrahydrofuran; polyakyl silicone polymers, e.g., dimethyl silicone polymer and the like. In addition the base can be gasoline, fuel oils or greases.

Oil compositions of this invention can be further modified by the addition of conventional pour point depressants, viscosity index improvers, blooming agents, corrosion inhibitors, oiliness agents, solubilizers, and the like. Among such materials are high molecular weight polymeric esters of methacrylic acid and long chain fatty alcohols, e.g. mixtures of wax-naphthalene condensation products, isobutylene polymers, alkyl styrene polymers; inorganic and organic nitrites such as $NaNO_2$ and diisopropylammonium nitrite and dicyclohexylammonium nitrite; organic phosphites, phosphates and phosphonates such as di or trichloroethyl phosphite, di or tricresyl phosphate, di or trilorolphosphate, phosphorous sulfide-olefinic reaction products such as $P_2S_5$-terpene reaction products, metal organic phosphates, e.g. Ca or Zn dicyclohexylthiophosphate or 2-ethylhexylthiophosphate; organic sulfides, e.g., wax disulfide, ethylene bistolyl sulfide; amines, e.g., octadecylamine and the like. Also, phenolic antioxidants such as 2,6-ditertiary-4-methyl phenol, 2,6-ditertiarybutyl-4-methylol phenol, 2,2′-methylene bis(4-methyl-6-tertiarybutylphenol), 4,4′-methylene bis(2,6-ditert.butylphenol) as well as conventional metallic detergents of the sulfonate and phenate class exemplified by alkali and alkaline earth organic sulfonates and phenates, e.g., sodium, basic calcium or basic barium petroleum sulfonate and sodium, calcium, barium or zinc cetyl phenate, basic calcium or basic barium $C_{14-18}$ alkyl salicylate and barium, barium or zinc salt of octyl phenol-formaldehyde condensation product, etc., can be used in conjunction with the polymers of this invention.

The outstanding properties of oil compositions of this invention were demonstrated when a mineral lubricating oil containing 2% of additive of Example I (Composition A) or 2% of additive of Example II (Composition B) were found to have VI values of about 140 as compared to 92 for the neat oil and in the caterpillar L–1 engine test Compositions A and B gave clean engines with no evidence of wear or corrosion or sludge formation, whereas a commercial detergent oil containing a metallic detergent (sulfonate) tested under the same engine test conditions resulted in severe corrosion and sludge formation in the engine. Other compositions capable of producing similar results are: Composition C [mineral oil+2% Example IV copolymer +0.5% 2,2′-methylene bis(4-methyl-6-tert.butylphenol)], Composition D [mineral oil+3% Example III copolymer+0.5% 4,4′-methylene bis(2,6-ditert.butylphenol)], Composition E [mineral oil+5% Example I copolymer+0.2% 4,4′-methylene bis(2,6-ditert. butylphenol)+0.8% tricresyl phosphate], Composition F [fuel oil+1% Example III copolymer], Composition G [fuel oil+0.1% Example I copolymer+0.1% 4,4′-methylene bis(2,6-ditert.butyl phenol)].

The polymer sulfides containing compounds of this invention can be used to improve other types of compositions such as fuel oils, greases, hydraulic fluids of the oil, water-in-oil emulsion or synthetic type with respect to wear inhibition, insecticidal compositions, waxes, resins and the like.

I claim as my invention:

1. An improved mineral oil composition comprising a major amount of mineral oil and from about 0.1% to 10% by weight of a copolymer of an ester of methacrylic acid and a $C_{12-20}$ alkanol and a vinyl sulfide having the formula $CH_2=CHS-R'-Y$ where $R'$ is $C_{2-18}$ hydrocarbyl radical and Y is a polar radical selected from the group consisting of —OH and —COOH, in the mol ratio of 1:10 to 10:1, respectively, and such that the end product contains at least 8 units selected from the ester and vinyl sulfide units and at least 2 of each group being present in the end product, said copolymer having a molecular weight of from about 1000 to about 2,500,000.

2. An improved mineral oil composition comprising a major amount of mineral oil and from about 0.1% to about 10% by weight of a copolymer of an ester of methacrylic acid and $C_{12-20}$ alkanol and a HO—$C_{2-18}$ alkyl vinyl sulfide, in the mol ratio of 1:10 to 10:1, respectively, and such that the end product contains at least 8 units selected from the ester and vinyl sulfide units and at least 2 of each group being present in the end product, said copolymer having a molecular weight of from about 1000 to about 2,500,000.

3. An improved mineral lubricating oil comprising a major amount of mineral lubricating oil and from about 0.1% to 10% by weight of a copolymer of $C_{12-20}$ alkyl methacrylate and a HO—$C_{2-18}$ alkyl vinyl sulfide in the mol ratio of 1:3 to 5:1, respectively, and such that the end product containing at least 8 units selected from the ester and vinyl sulfide unit and at least 2 of each group being present in the end product, said copolymer having a molecular weight from about 10,000 to about 600,000.

4. An improved mineral lubricating oil comprising a major amount of mineral lubricating oil and from about 0.1% to 10% by weight of a copolymer of stearyl methacrylate and hydroxy ethyl vinyl sulfide in the mol ratio of 1:3 to 5:1, respectively, and such that the end product containing at least 8 units selected from the ester and vinyl sulfide unit and at least 2 of each group being present in the end product, said copolymer having a molecular weight from about 10,000 to about 600,000.

5. An improved mineral lubricating oil comprising a major amount of mineral lubricating oil and from about 0.1% to 10% by weight of a copolymer of stearyl methacrylate, lauryl methacrylate and hydroxyethyl vinyl sulfide in the mol ratio of 1:3 to 5:1, respectively, and such that the end product containing at least 8 units selected from the ester and vinyl sulfide unit and at least 2 of each group being present in the end product, said copolymer having a molecular weight from about 10,000 to about 600,000.

6. An improved mineral lubricating oil comprising a major amount of mineral lubricating oil and from about 0.1% to 10% by weight of a copolymer of stearyl methacrylate, lauryl methacrylate, 2-methyl-5-vinylpyridine and hydroxyethyl vinyl sulfide in the mol ratio of 1:3 to 5:1, respectively, and such that the end product containing at least 8 units selected from the ester and vinyl sulfide unit and at least 2 of each group being present in the end product, said copolymer having a molecular weight from about 10,000 to about 600,000.

7. The composition of claim 5 containing from about 0.1% to about 0.5% by weight of alkylated methylene bisphenol.

8. The composition of claim 4 containing from about 0.1% to about 0.5% by weight each of 4,4'-methylene bis(2,6-ditertbutyl phenol) and tricresyl phosphate.

9. An improved fuel oil comprising a major amount of fuel oil and from about 0.1% to 10% by weight of a copolymer of an ester of methacrylic acid and a $C_{12-20}$ alkanol and a vinyl sulfide in the mol ratio of 1:3 to 5:1, respectively, and such that the end product containing at least 8 units selected from the ester and vinyl sulfide unit and at least 2 of each group being present in the end product, said copolymer having a molecular weight of from about 1000 to about 2,500,000.

10. An improved fuel oil comprising a major amount of fuel oil and from about 0.1% to 10% by weight of a copolymer of stearyl methacrylate and hydroxyethyl vinyl sulfide in the mol ratio of 1:3 to 5:1, respectively, and such that the end product containing at least 8 units selected from the ester and vinyl sulfide unit and at least 2 of each group being present in the end product, said copolymer having a molecular weight from about 10,000 to about 600,000.

References Cited by the Examiner

UNITED STATES PATENTS

| | | | |
|---|---|---|---|
| 2,503,401 | 4/50 | Mattano et al. | 252—48.6 |
| 2,540,093 | 2/51 | Brooks | 252—48.6 |
| 2,807,653 | 9/57 | Filbey et al. | |
| 2,890,224 | 6/59 | Schneider | 260—79.7 X |
| 2,906,741 | 9/59 | Hwa | 260—79.7 |
| 2,933,479 | 4/60 | McBurney et al. | 260—79.7 |
| 2,947,730 | 8/60 | Holly et al. | 260—79.7 |
| 2,947,731 | 8/60 | Nummy | 260—79.7 |
| 2,957,854 | 10/60 | Lorensen et al. | 252—51.5 X |
| 3,041,283 | 6/62 | Calhoun et al. | 252—48.6 |
| 3,041,284 | 6/62 | Calhoun et al. | 252—48.6 |
| 3,100,748 | 8/63 | Richards et al. | 252—48.6 |
| 3,102,863 | 9/63 | Herbert et al. | 252—48.6 |

FOREIGN PATENTS 446,567  4/36  Great Britain.

DANIEL E. WYMAN, *Primary Examiner.*

JULIUS GREENWALD, *Examiner.*